United States Patent
Hong et al.

(10) Patent No.: US 6,886,701 B2
(45) Date of Patent: May 3, 2005

(54) DISPLAY APPARATUS HAVING A STRUCTURE FOR WALL MOUNTING

(75) Inventors: You-sik Hong, Suwon (KR); Young-tae Kim, Yongin (KR); Dae-hyoun Byoun, Seoul (KR)

(73) Assignee: Samsung Electronics Co., LTD, Suwon-si (KR)

( * ) Notice: Subject to any disclaimer, the term of this patent is extended or adjusted under 35 U.S.C. 154(b) by 0 days.

(21) Appl. No.: 10/316,857

(22) Filed: Dec. 12, 2002

(65) Prior Publication Data

US 2003/0222041 A1 Dec. 4, 2003

(30) Foreign Application Priority Data

May 28, 2002 (KR) ......................................... 2002-29541

(51) Int. Cl.$^7$ ................................................. A47H 1/00
(52) U.S. Cl. ...................... 211/99; 211/104; 248/284.1; 248/292.13; 248/923
(58) Field of Search ............................ 211/99, 104, 96, 211/100, 168, 170; 248/276.1, 284.1, 291.1, 292.13, 371, 372.1, 398, 923, 239, 240, 240.1, 917, 922, 280.11

(56) References Cited

U.S. PATENT DOCUMENTS

| | | | | |
|---|---|---|---|---|
| 945,762 A | * | 1/1910 | Dieleman | 248/292.13 |
| 3,578,153 A | * | 5/1971 | Olson | 206/379 |
| 4,114,764 A | * | 9/1978 | Rich | 211/100 |
| 5,560,501 A | * | 10/1996 | Rupert | 211/99 |
| 5,566,843 A | * | 10/1996 | Kruska | 211/104 |
| 6,269,958 B1 | * | 8/2001 | Pollock et al. | 211/18 |
| 6,402,109 B1 | * | 6/2002 | Dittmer | 248/284.1 |
| 6,464,091 B1 | * | 10/2002 | Nagasaki | 211/104 |
| 6,554,242 B2 | * | 4/2003 | Kim | 248/371 |
| 6,604,722 B1 | * | 8/2003 | Tan | 248/276.1 |
| 2002/0033436 A1 | * | 3/2002 | Peng et al. | 248/284.1 |
| 2002/0179791 A1 | * | 12/2002 | Kwon | 248/284.1 |

FOREIGN PATENT DOCUMENTS

| | | |
|---|---|---|
| JP | 60-54817 | 4/1985 |
| JP | 62-29184 | 2/1987 |
| JP | 62-192676 | 12/1987 |
| JP | 2-120876 | 9/1990 |
| JP | 5-36523 | 5/1993 |
| JP | 7-11067 | 2/1995 |
| JP | 10-149106 | 6/1998 |
| JP | 11-344934 | 12/1999 |

* cited by examiner

*Primary Examiner*—Carl D. Friedman
*Assistant Examiner*—Jennifer E. Novosad
(74) *Attorney, Agent, or Firm*—Staas & Halsey LLP

(57) ABSTRACT

A display apparatus having a display main body formed with a display part, further having a lower hinge part provided in a rear lower part of the display main body so as to tilt the display main body against an installation plane and a link assembly provided in a rear upper part of the display main body, and connecting the display main body to the installation plane. The link assembly includes a first link having a first end rotatably connected to the installation plane and an opposite second end and a second link having a first end rotatably connected to the display main body and a second end rotatably connected to the second end of the first link. The link assembly further includes a spring member provided in at least one of the hinge parts of the first and second links and has the elasticity to restore the display main body toward the installation plane.

31 Claims, 6 Drawing Sheets

DISPLAY APPARATUS HAVING A STRUCTURE FOR WALL MOUNTING

CROSS-REFERENCE TO RELATED APPLICATIONS

This application claims the benefit of Korean Application No. 2002-29541, filed May 28, 2002, in the Korean Industrial Property Office, the disclosure of which is incorporated herein by reference.

BACKGROUND OF THE INVENTION

1. Field of the Invention

The present invention relates to a display apparatus, and more particularly, to a display apparatus improved in structure for wall mounting.

2. Description of the Related Art

Generally, a display apparatus comprises a display main body having a display part, and a mounting rack to mount the display main body onto a predetermined installation plane.

Recently, because the display part of the display main body is made of an LCD, a PDP, etc., the displaying area thereof becomes relatively enlarged and the thickness thereof becomes relatively thin, so that the display apparatus can be easily mounted onto a wall.

Accordingly, there has been proposed a mounting rack to mount an object such as a display main body, etc., onto a wall in Japanese Patent Publication No. 1999-344934. The conventional mounting rack, as illustrated in FIG. 1, comprises a display main body 101 provided with a display part, a pair of arms 150 supporting the display main body 101, a base 130 rotatably connected to the lower part of the arm 150 and mounted onto the wall 170, and a mounting bracket 110 provided between the arm 150 and the base 130 and connecting the arm 150 and the base 130 foldably.

The mounting bracket 110 includes a first link 113 having a first end rotatably connected to the upper part of the base 130 and an opposite second end, a second link 117 having a first end rotatably connected to the arm 150 and a second end rotatably connected with the second end of the first link 113, and a locking member 116 provided in the connected position of the first and second links 113 and 117 and controlling a relative rotation between the first and second links 113 and 117.

Herein, the locking member 116 is provided with a compression spring (not shown) therein, and therefore the relative rotation between the first and second links 113 and 117 can be locked and released by the elasticity of the compression spring. Further, the locking member 116 is selectively locked at a desired angle among seven predetermined step angles.

The base 130 is provided with a shock absorber. The shock absorber includes a gas damper 160 mounted in the base 130, and a wire 161 having a first end connected to the upper part of the gas damper 160 and a second end connected to a shaft (not shown) between the pair of arms 150. Therefore, even if the locking member 116 is released, the display main body 101 is prevented from being forwardly tilted due to its own weight.

As described above, according to the conventional mounting rack, the arm and the base are provided between an object and the wall, and the mounting bracket is provided between the arm and the base, thereby tilting the object such as the display main body. Further, the mounting member is provided with the locking member, thereby locking the object at a predetermined angle. Further, the base is provided with the shock absorber having the gas damper and the wire, thereby preventing the object from being over-tilted due to its own weight when the locking member is released. Thus, a user can adjust the tilt of the object by pressing it.

However, the conventional mounting rack is not only complicated in structure because of the shock absorber having the gas damper and the wire, a locking member, etc., but also difficult and cumbersome for a user to adjust the tilt of the object because the object should be tilted after the locking member is released. Further, because the object is stepwise tilted by the locking member, it is impossible to minutely adjust the tilt of the object.

SUMMARY OF THE INVENTION

Accordingly, it is an object of the present invention to provide a display apparatus which has a simple tilting structure, and whose tilt is easily and minutely adjusted.

Additional objects and advantages of the invention will be set forth in part in the description which follows and, in part, will be obvious from the description, or may be learned by practice of the invention.

The foregoing and other objects of the present invention are achieved by providing a display apparatus comprising a display main body formed with a display part, further comprising: a lower hinge part provided in a rear lower part of the display main body to tilt the display main body against an installation plane; and a link assembly provided in a rear upper part of the display main body, and connecting the display main body to the installation plane, the link assembly including: a first link having a first end rotatably connected to the installation plane and an opposite second end; a second link having a first end rotatably connected to the display main body and a second end rotatably connected to the second end of the first link; and a spring member provided in at least one of the hinge parts of the first and second links and having the elasticity to restore the display main body toward the installation plane.

In an aspect of the invention, the link assembly further includes a friction part provided in the hinge part of the first and second links and producing a rotation friction therebetween.

In another aspect of the invention, the rotation friction of the friction part is larger than the elasticity of the spring member.

In another aspect of the invention, the spring member includes a torsion spring having a first end coupled to the first link and a second end coupled to the second link.

In another aspect of the invention, the friction part includes a connecting bolt inserted in the torsion spring and in the hinge part of the first and second links; a connecting nut connected with the connecting bolt; and at least one washer provided between the connecting bolt and the connecting nut.

In another aspect of the invention, the display apparatus further comprises a base bracket mounted onto the installation plane and supporting the display main body and the link assembly, the base bracket including: a first link bracket provided in the upper part thereof and rotatably connected to the first end of the second link; and a second link bracket provided in the lower part thereof and rotatably connected to the rear lower part of the display main body.

In yet another aspect of the invention, the display apparatus further comprises a main body bracket detachably connected to the rear of the display main body and rotatably connected to the link assembly and the base bracket, the main body bracket including an upper part rotatably connected to the first end of the first link, and a lower part rotatably connected to the second link bracket of the base bracket.

In yet another aspect of the invention, the rear of the display main body is connected with at least one bolt to be coupled to the main body bracket, and the main body bracket is formed with at least one elongated hole in correspondence with the bolt of the display main body.

In yet another aspect of the invention, a head of the bolt connected to the display main body is spaced from the rear surface of the display main body by a predetermined distance, and is larger in diameter than a thread rod thereof in cross section, and the elongated hole has an upper part of the width larger than the diameter of the head of the bolt, and a lower part of the width smaller than the diameter of the head of the bolt and larger in diameter than the diameter of the thread rod of the bolt.

In yet another aspect of the invention, a plurality of elongated holes is provided so as to be connected with various sizes of a display main body.

In yet another aspect of the invention, the main body bracket includes a safety bolt provided adjacent to the elongated hole and prevents the display main body from being separated from the main body bracket due to an external force, and a safety bolt hole in which the safety bolt is inserted.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE EMBODIMENTS

Figure 1:
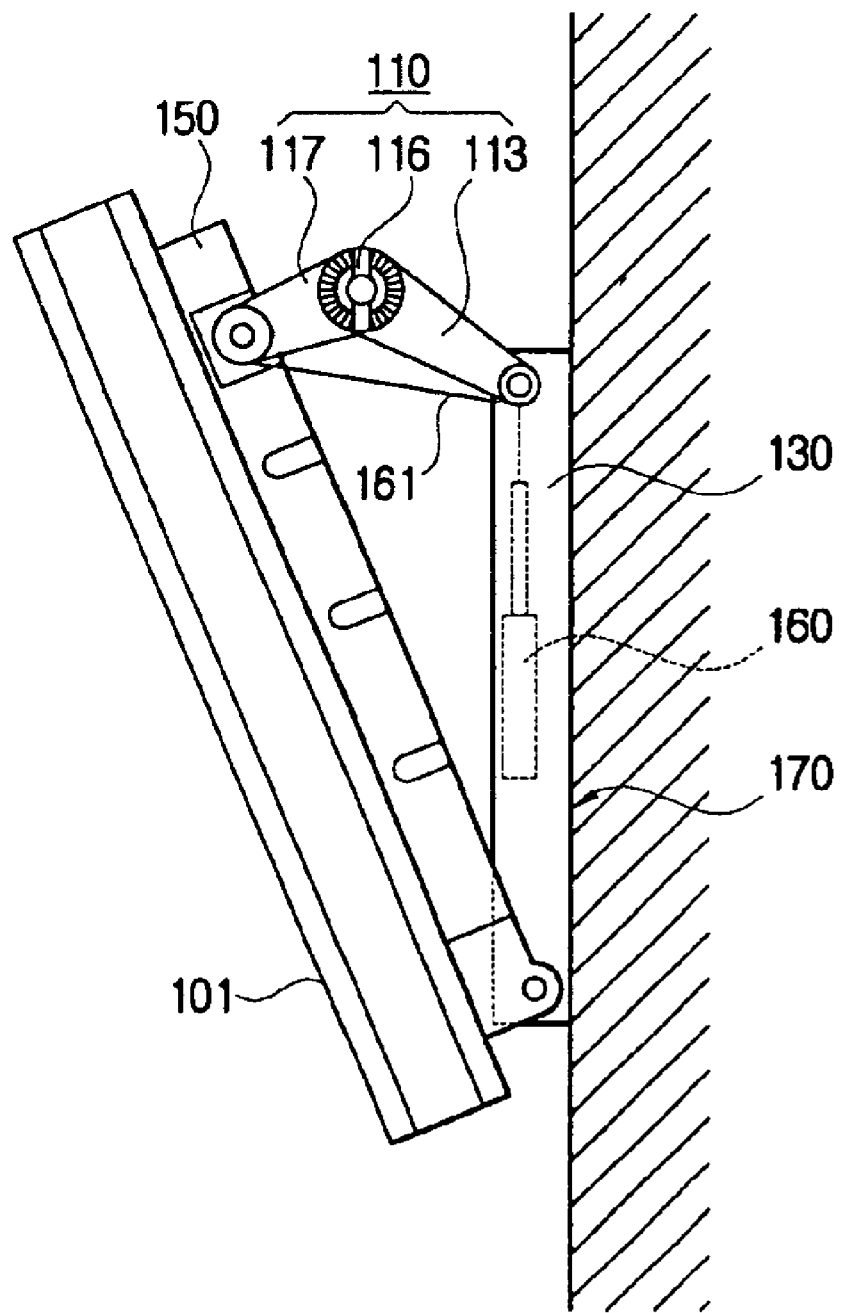
FIG. 1 is a side view of a conventional display apparatus.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
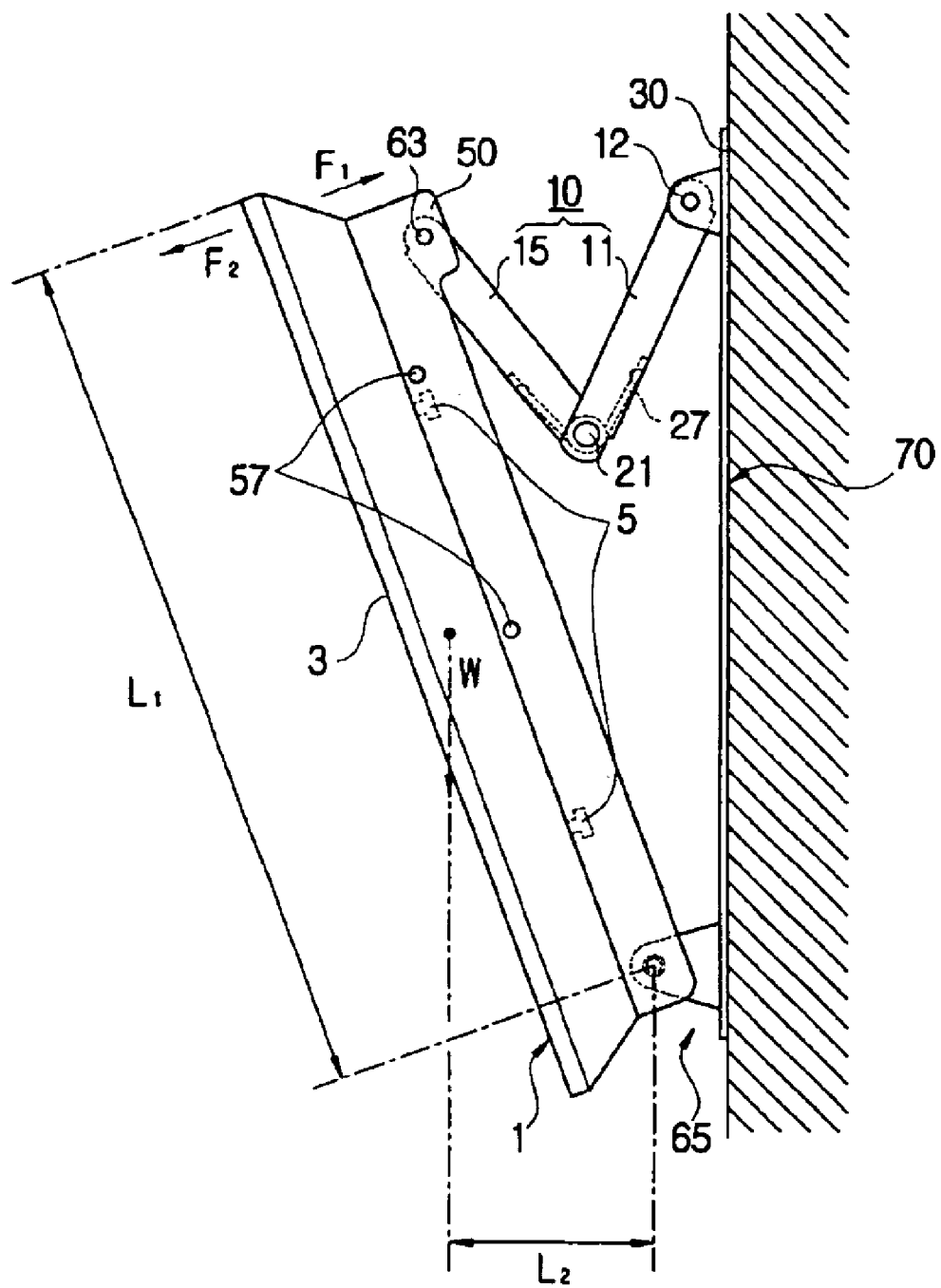
FIG. 2 is a side view of a display apparatus according to the present invention.
Figure 3:
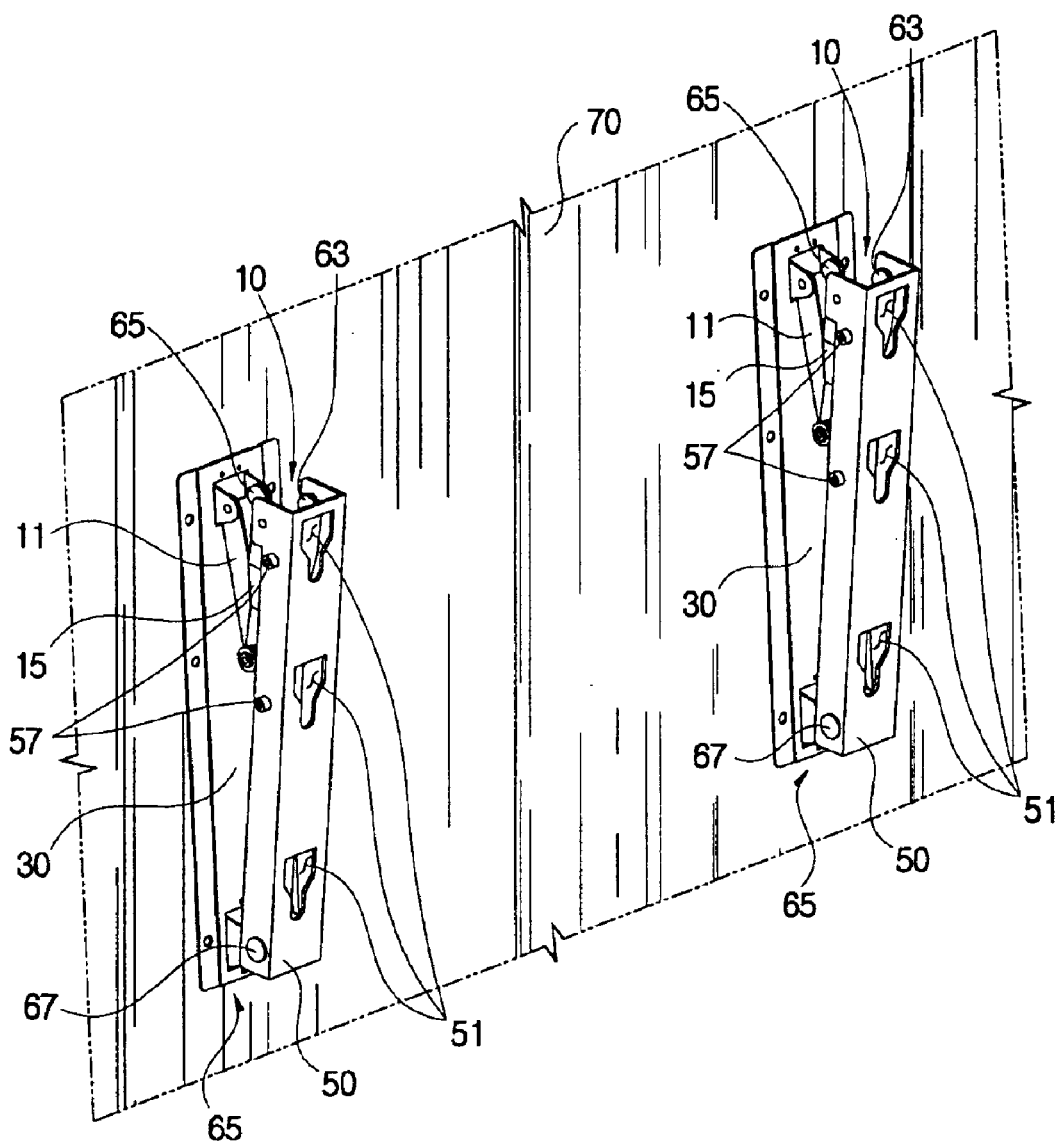
FIG. 3 is a perspective view of a mounting rack for the display apparatus according to the present invention.
Figure 4:
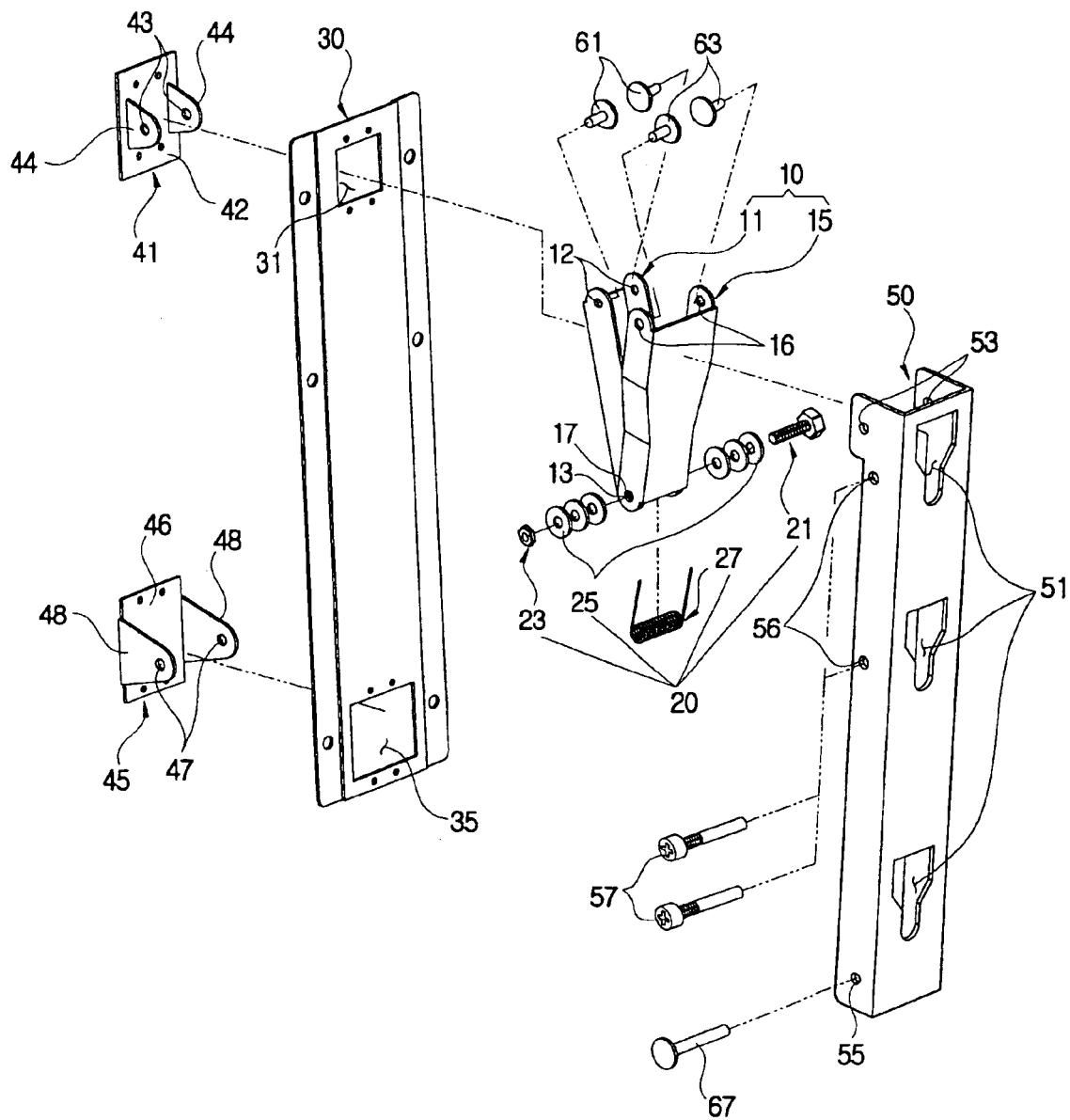
FIG. 4 is an exploded perspective view of the mounting rack for the display apparatus according the present invention.

As illustrated in FIGS. 2 through 4, a display apparatus according to the present invention comprises a display main body 1 having a display part 3, and a mounting rack mounting the display main body 1 onto a predetermined installation plane and allowing the display main body 1 to be tilted. The mounting rack includes a main body bracket 50 supporting the display main body 1, a base bracket 30 rotatably supporting the main body bracket 50 and mounted onto a wall 70, and a link assembly 10 provided between the main body bracket 50 and the base bracket 30.

As illustrated in FIG. 3, two mounting racks are mounted onto the wall 70 in parallel, and one display main body 1 is connected thereto. Hereinafter, the left mounting rack will be described as a representative mounting rack.

The display main body 1 includes the display part 3 made of an LCD, a PDP, etc., provided in the front thereof, and a plurality of bolts 5 provided in the rear thereof to connect the display main body 1 with the main body bracket 50 through a plurality of elongated holes 51 (to be described later). The bolts 5 are connected to the rear surface of the display main body 1, with heads of the bolts 5 being spaced from the rear surface of the display main body 1 at a predetermined distance. Herein, each bolt 5 has the head larger in diameter than a thread rod in a cross section.

The main body bracket 50 has a "U"-shaped cross section, and is formed with a pair of second pin coupling holes 53 in the upper part thereof. The second pin coupling hole 53 is rotatably coupled to a second pin through hole 16 of a second link 15 (to be described later). Herein, the main body bracket 50 is larger than the second link 15 in width, so that the second pin through holes 16 are accommodated inside the pair of the second pin coupling holes 53. Further, the main body bracket 50 is formed with a pair of third pin coupling holes 55 in the lower part thereof. The third pin coupling hole 55 is rotatably coupled to a second link bracket 45 of the base bracket 30 (to be described later), thereby forming a lower hinge part 65. Further, the main body bracket 50 is formed with the elongated holes 51 on the surface thereof in correspondence with the bolts 5 combined to the rear of the display main body 1.

The elongated hole 51 has an upper part of the width larger than the diameter of the head of the bolt 5, and a lower part of the width smaller than the diameter of the head of the bolt 5 and larger than the diameter of the thread rod of the bolt 5. Thus, the heads of the bolts 5 combined to the rear surface of the display main body 1, being spaced from each other at a predetermined distance, are inserted into the upper part of the elongated hole 51 and then latched to the lower part of the elongated hole 51, so that the display main body 1 can be easily combined to the main body bracket 50. Herein, there is provided the plurality of elongated holes 51 so as to combine various sizes of a display main body and the main body bracket 50.

The main body bracket 50 includes a safety bolt 57 preventing the display main body 1 from being separated from the main body bracket 50 due to an external force, and a safety bolt hole 56 positioned at the opposite walls thereof adjacent to the elongated hole 51. Thus, after the head of the bolt 5 connected to the display main body 50 is coupled to the elongated hole 51 of the main body bracket 50, the safety bolt 57 is inserted in the safety bolt hole 56 formed on the main body bracket 50, so that the head of the bolt 5 is blocked by the safety bolt 57, thereby preventing the bolt 5 from being unfastened from the elongated hole 51.

The lower hinge part 65 is formed by rotatably connecting the third pin coupling holes 55 of the main body bracket 50 and the second link bracket 45 of the base bracket 30 (to be described later) by means of a third hinge pin 67.

The base bracket 30 is shaped like a thin board, and mounted onto the wall 70. On the upper part of the base bracket 30 is formed a first rectangular through hole 31 through which a first link bracket 41, rotatably coupled to a first pin through hole 12 of a first link 11, is fastened. Further, on the lower part of the base bracket 30 is formed a second rectangular through hole 35 through which the second link bracket 45, rotatably coupled to the third pin coupling hole 55 of the main body bracket 50, is fastened.

The first link bracket 41 includes a flat surface 42 fastened under the first through hole 31 formed on the upper part of the base bracket 30, and a pair of brackets 44 each protruding from the flat surface 42 and each having a first pin coupling hole 43 rotatably coupled to the first pin through hole 12 of the first link 11 (to be described later).

The second link bracket 45 includes a flat surface 46 fastened under the second through hole 35 formed on the lower part of the base bracket 30, and a pair of brackets 48 each protruding from the flat surface 46 and each having a third pin through hole 47 rotatably coupled to the third pin coupling hole 55 of the main body bracket 50.

The link assembly 10 includes the first and second links 11 and 15 foldably to connect the display main body 1 and the wall 70, a torsion spring 27 provided between the first and second links 11 and 15 and having the elasticity to restore the display main body 1 to the wall 70, and a friction part 20 provided in a hinge part of the first and second links 11 and 15 and producing a rotation friction therebetween. Herein, it is preferable that the rotation friction of the friction part 20 is larger than the elasticity of the torsion spring 27.

The first link 11 has a "U"-shaped cross section, and includes a first end formed with the pair of first pin through holes 12 rotatably coupled to the first pin coupling hole 43 of the first link bracket 41 by means of a pair of first hinge pins 61, and a second end formed with a pair of bolt combining holes 13 rotatably coupled to the second link 15.

Like the first link 11, the second link 15 has a "U"-shaped cross section, and includes a first end formed with the pair of second pin through holes 16 rotatably coupled to the second pin coupling holes 53 of the main body bracket 50 by means of a pair of second hinge pins 63, and a second end formed with a pair of bolt through holes 17 rotatably coupled to the bolt combining holes 13 of the first link 11. Herein, the second link 15 is larger than the first link 11 in width, so that the first link 11 can be folded and accommodated inside the second link 15.

The torsion spring 27 is put on a connecting bolt 21 of the friction part 20, and includes a first end coupled to the first link 11 and a second end coupled to the second link 15. The torsion spring 27 elastically draws the first link 11 toward the second link 15. Thus, the torsion spring 27 elastically restores the display main body 1 to the wall 70. Herein, it is preferable that the elasticity of the torsion spring 27 is approximately equal to the torque produced by the weight of the display main body 1 about the lower hinge part 65.

The friction part 20 includes the connecting bolt 21 inserted in the bolt connecting hole 13 of the first link 11, the bolt through hole 17 of the second link 15, through the torsion spring 27, a connecting nut 23 connected with the connecting bolt 21, and a plurality of washers 25 provided between the connecting bolt 21 and the connecting nut 23. Thus, as the connecting bolt 21 and the connecting nut 23 are tightened, the friction part 20 produces the rotation friction between the first and second links 11 and 15. Herein, the rotation friction is preferably a little larger than the elasticity of the torsion spring 27.

Therefore, even if the display main body 1 is released from the main body bracket 50, the tilt of the main body bracket 50 against the base bracket 30 is not changed because the rotation friction is larger than the elasticity of the torsion spring 27. Further, the plurality of washers 25 provided between the connecting bolt 21 and the connecting nut 23 prevents the connecting bolt 21 and the connecting nut 23 from being loosened.

Figure 5:
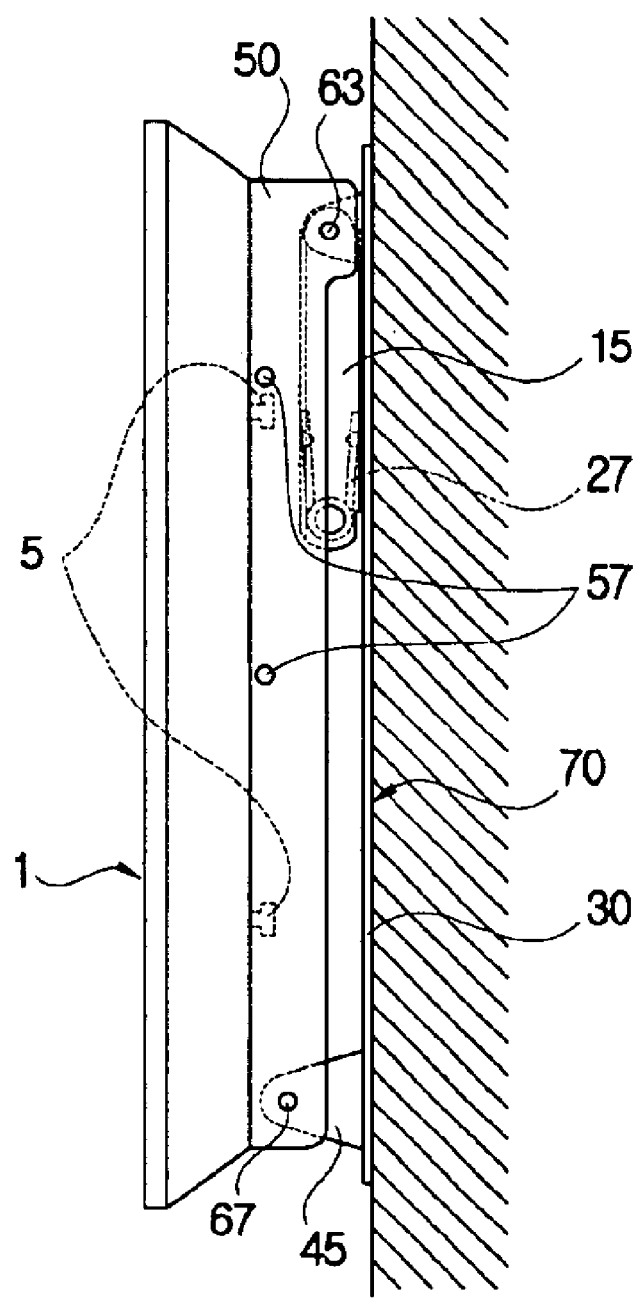
FIG. 5 is a side view illustrating a folded state of the display apparatus of FIG. 2.

As illustrated in FIG. 5, the display apparatus according to this embodiment of the present invention can be folded onto the wall 70 by backwardly pressing and tilting the display main body 1 of FIG. 2 about the lower hinge part 65. At this time, a user can easily tilt the display main body 1 toward the wall 70 by only a little force because of the elasticity of the torsion spring 27 restoring the display main body 1 to the wall 70. Further, the second link 15 accommodates the first link 11 by rotating about the friction part 20, and the main body bracket 50 accommodates the second link 15, so that main body bracket 50 and the base bracket 30 are close up against each other. Moreover, the display apparatus is kept in the folded state by the friction of the friction part 20.

Referring to FIG. 2, in order to tilt the display main body 1 toward the wall 70, a backward torque "$T_1 = F_1 \times L_1$" produced by a force "$F_1$" backwardly pressing the upper part of the display main body 1 about the lower hinge part 65 should be a little larger than a frictional energy "$E_1$" due to the friction of the friction part 20 minus the difference between an elastic energy "$E_2$" due to the elasticity of the torsion spring 27 elastically restoring the display main body 1 in an opposite direction of the torque "$T_2$" and a torque "$T_2 = W \times L_2$" produced by the weight "W" of the display main body 1 about the lower hinge part 65. That is, $T_1 > E_1 - (E_2 - T_2)$. Further, as described above, because the elastic energy "$E_2$" due to the elasticity of the torsion spring 27 is approximately equal to the torque "$T_2$" of the display main body 1, the backward torque "$T_1$" should be only larger than the frictional energy "$E_1$" due to the friction of the friction part 20.

Figure 6:
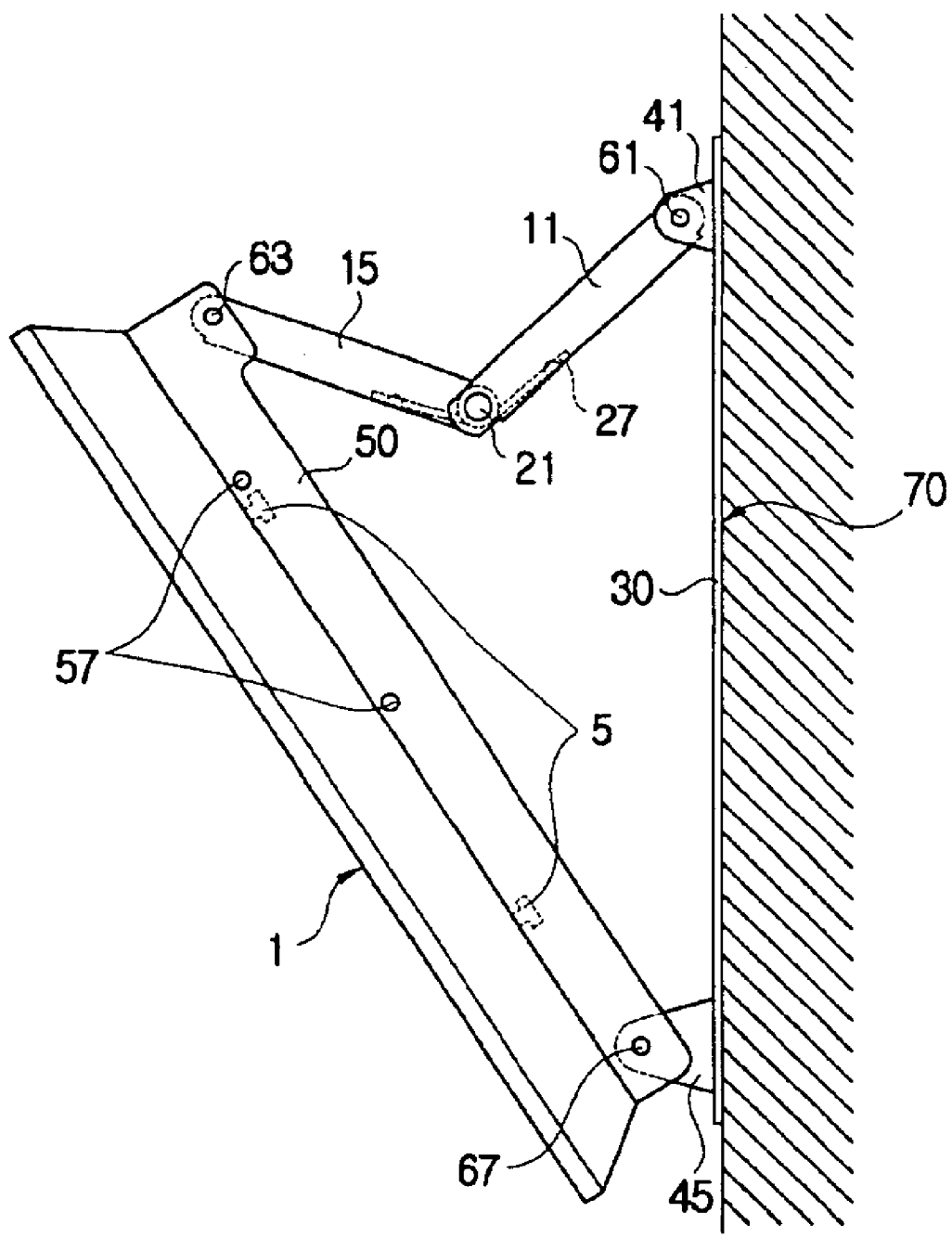
FIG. 6 is a side view illustrating an unfolded state of the display apparatus of FIG. 2.

As illustrated in FIG. 6, the display apparatus according to the present invention can be expanded from the wall 70 by forwardly pressing and tilting the display main body 1 of FIG. 2 about the lower hinge part 65. At this time, the display main body 1 is prevented from being rapidly expanded from the wall 70 because of the elasticity of the torsion spring 27 restoring the display main body 1 to the wall 70. Further, the display apparatus is kept in the expanded state by the friction of the friction part 20.

On the other hand, it is an aspect of the invention that at least one of the first and second links 11 and 15 and the lower hinge part 65 is provided with a stopper (not shown) between the main body bracket 50 and the base bracket 30 to restrict the tilt of the display main body 1.

Turning to FIG. 2, in order to tilt the display main body 1 forwardly against the wall 70, a forward torque "$t_1 = F_2 \times L_1$" produced by a force "$F_2$" forwardly pressing the upper part of the display main body 1 about the lower hinge part 65 should be a little larger than the frictional energy "$E_1$" due to the friction of the friction part 20 minus the difference between the torque "$T_2 = W \times L_2$" produced by the weight "W" of the display main body 1 about the lower hinge part 65 and the elastic energy "$E_2$" due to the elasticity of the torsion spring 27 elastically restoring the display main body 1 in an opposite direction of the torque "$T_2$". That is, $t_1 > E_1 - (T_2 - E_2)$. Further, as described above, because the elastic energy "$E_2$" due to the elasticity of the torsion spring 27 is approximately equal to the torque "$T_2$" of the display main body 1, the forward torque "$t_1$" should be only larger than the frictional energy "$E_1$" due to the friction of the friction part 20. Herein, the backward torque "$T_1$" and the forward torque "$t_1$" are approximately equal to each other, so that nearly the same force is needed to tilt the display main body 1 regardless of forward or backward tilting. Therefore, there is no inconvenience due to the difference of force between backward and forward tilting. Furthermore, a user can minutely adjust the tilt of the display main body 1.

In the foregoing embodiment, the base bracket 30 is provided between the wall 70 and the link assembly 10. However, the link assembly 10 may be directly mounted onto the wall, without the base bracket 30. Further, in the foregoing embodiment, the main body bracket 50 is provided between the link assembly 10 and the display main body 1. However, the link assembly 10 may be directly connected to the display main body 1 without the main body bracket 50.

In the foregoing embodiment, the friction part 20 is provided in the hinge part between the first and second links 11 and 15. However, a friction part may be provided in a hinge part between the base bracket and the first link, or between the main body bracket and the second link.

In the foregoing embodiment, the torsion spring 27 is provided in the friction part 20 between the first and second links 11 and 15. However, a spring member such as a flat spring, a compression spring, and an extension spring, etc., may be provided in at least one of hinge parts provided among the display main body, the wall and the first and second links.

In the foregoing embodiment, one display main body 1 needs a pair of mounting racks. However, one display main body may need one mounting rack or three or more mounting racks according to the size of the display main body.

In the foregoing embodiment, the safety bolt 57 and the safety bolt hole 56 are employed to prevent the display main body 1 from being separated from the main body bracket 50. However, a safety pin without a screw thread and a safety pin hole may be employed instead of the safety bolt 57 and the safety bolt hole 56.

Thus, a display apparatus according to the present invention comprises first and second links, a spring member and a friction part between a display main body and a wall, so that the display apparatus has a simple tilting structure and is tilted by a little force. Further, the display apparatus is designed to need nearly the same force to tilt the display main body regardless of forwardly or backwardly tilting, so that the tilt of the display apparatus is easily and minutely adjusted.

As described above, the present invention provides a display apparatus which has a simple tilting structure, and whose tilt is easily and minutely adjusted.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus including a display main body formed with a display part, the display apparatus comprising:
   a lower hinge part provided in a rear lower part of the display main body to tilt the display main body against an installation plane; and
   a link assembly provided in a rear upper part of the display main body, and connecting the display main body to the installation plane, the link assembly including:
   a first link having a first end rotatably connected to the installation plane and an opposite second end;
   a second link having a first end rotatably connected to the display main body and a second end rotatably connected to the second end of the first link; and
   a spring member provided between the first and second links and having elasticity to restore the display main body toward the installation plane.

2. The display apparatus according to claim 1, wherein the link assembly further includes a friction part provided in a hinge part of the first and second links and producing a rotation friction therebetween.

3. The display apparatus according to claim 2, wherein the rotation friction of the friction part is larger than the elasticity of the spring member.

4. The display apparatus according to claim 3, wherein the spring member includes a torsion spring having a first end coupled to the first link and a second end coupled to the second link.

5. The display apparatus according to claim 4, wherein the friction part includes:
   a connecting bolt inserted in the torsion spring and in the hinge part of the first and second links;
   a connecting nut connected with the connecting bolt; and
   at least one washer provided between the connecting bolt and the connecting nut.

6. The display apparatus according to claim 4, wherein a backward torque "$T_1=F_1 \times L_1$" produced by a force "$F_1$" backwardly pressing the upper part of the display main body about the lower hinge part is larger than a frictional energy "$E_1$" due to the friction of the friction part minus the difference between an elastic energy "$E_2$" due to the elasticity of the torsion spring elastically restoring the display main body in an opposite direction of the torque "$T_2$" and a torque "$T_2=W \times L_2$" produced by the weight "W" in of the display main body about the lower hinge part so that $T_1 > E_1 - (E_2 - T_2)$.

7. The display apparatus according to claim 6, wherein the backward torque "$T_1$" is larger than the frictional energy "$E_1$" due to the friction of the friction part.

8. The display apparatus according to claim 4, wherein a forward torque "$t_1=F_2 \times L_1$" produced by a force "$F_2$" forwardly pressing the upper part of the display main body about the lower hinge part is larger than the frictional energy "$E_1$" due to the friction of the friction part minus the difference between the torque "$T_2=W \times L_2$" produced by the weight "W" of the display main body about the lower hinge part and the elastic energy "$E_2$" due to the elasticity of the torsion spring elastically restoring the display main body in an opposite direction of the torque "$T_2$" such that $t_1 > E_1 - (T_2 - E_2)$.

9. The display apparatus according to claim 8, wherein the forward torque "$t_1$" is larger than the frictional energy "$E_1$" due to the friction of the friction part.

10. The display apparatus according to claim 1, further comprising a base bracket mounted onto the installation plane and supporting the display main body and the link assembly, the base bracket including:
    a first link bracket provided in the upper part thereof and rotatably connected to the first end of the first link; and
    a second link bracket provided in the lower part thereof and rotatably connected to the rear lower part of the display main body.

11. The display apparatus according to claim 10, further comprising:
    a main body bracket detachably connected to the rear of the display main body and rotatably connected to the link assembly and the base bracket, the main body bracket including:

an upper part rotatably connected to the first end of the second link; and a lower part rotatably connected to the second link bracket of the base bracket.

12. The display apparatus according to claim 11, wherein the rear of the display main body is connected with at least one bolt to be coupled to the main body bracket, and the main body bracket is formed with at least one elongated hole in correspondence with the bolt of the display main body.

13. The display apparatus according to claim 12, wherein a head of the bolt connected to the display main body is spaced from the rear surface of the display main body by a predetermined distance, and is larger in diameter than a thread rod thereof in cross section, and the elongated hole has an upper part having a width larger than the diameter of the head of the bolt, and a lower part having a width smaller than the diameter of the head of the bolt and larger in diameter than the diameter of the thread rod of the bolt.

14. The display apparatus according to claim 13, wherein a plurality of elongated holes is provided to be connected with various sizes of the display main body.

15. The display apparatus according to claim 13, wherein the main body bracket includes a safety bolt provided adjacent to the elongated hole and prevents the display main body from being separated from the main body bracket due to an external force, and a safety bolt hole in which the safety bolt is inserted.

16. The display apparatus according to claim 13, wherein the main body bracket includes a safety pin provided adjacent to the elongated hole and prevents the display main body from being separated from the main body bracket due to an external force.

17. The display apparatus according to claim 11, wherein the link assembly further includes a friction part provided in a hinge part between the main body bracket and the second link.

18. The display apparatus according to claim 10, wherein the link assembly further includes a friction part provided in a hinge part between the base bracket and the first link.

19. The display apparatus according to claim 1, further comprising a pair of base brackets mounted onto the installation plane and supporting the display main body and the link assembly, each of the base brackets including:

a first link bracket provided in the upper part thereof and rotatably connected to the first end of the first link; and a second link bracket provided in the lower part thereof and rotatably connected to the rear lower part of the display main body.

20. A mounting rack comprising:
a main body bracket;
a base bracket;
a link assembly having a first link and a second link rotatably connected to each other at respective first ends and connected to the main body bracket and the base bracket at respective second ends, the link assembly connecting the main body bracket and the base bracket such that an elastic member, between the first and second links, restores the main body bracket toward the base bracket.

21. The mounting rack according to claim 20, wherein a second end of the first link is connected to the main body bracket and a second end of the second link is connected to the base bracket.

22. The mounting according to claim 20, wherein the elastic member is a spring positioned at the rotatable connection between the first link and the second link.

23. The mounting rack according to claim 20, wherein the base bracket comprises bracket members connected thereto to allow the base bracket to be secured to a wall.

24. The mounting rack according to claim 20, wherein
the main body bracket comprises at least two elongated holes to allow bolts to extend therethrough to connect the main body bracket with a display panel.

25. The mounting rack according to claim 21, wherein the second link has a U-shaped cross section and is larger than the first link such that the first link can be accommodated within the second link.

26. A display apparatus including a display main body formed with a display part, the display apparatus comprising:

a lower hinge part provided in a rear lower part of the display main body to tilt the display main body against an installation plane; and a link assembly provided in a rear upper part of the display main body, and connecting the display main body to the installation plane, the link assembly including:

a first link having a first end rotatably connected to the installation plan and an opposite second end;

a second link having a first end rotatably connected to the display main body and a second end rotatably connected to the second end of the first link; and member, provided between the first and second links, to produce a rotation friction therebetween and to elastically restore the display main body toward the installation plane.

27. The display apparatus according to claim 26, further comprising a base bracket mounted onto the installation plane and supporting the display main body and the link assembly, the base bracket including:

a first link bracket rotatably connected to the first end of the first link; and a second link bracket rotatably connected to the rear lower part of the display main body.

28. The display apparatus according to claim 27, further comprising:

a main body bracket detachably connected to the rear of the display main body, the main body bracket including:

an upper part rotatably connected to the first end of the link; and a lower part rotatably connected to the second link bracket of the base bracket.

29. A display apparatus including a display main body formed with a display part, the display apparatus comprising:

a lower hinge part provided in a rear lower part of the display main body to tilt the display main body against an installation plane; and a link assembly provided in a rear upper part of the display main body, and connecting the display main body to the installation plane, the link assembly including:

a first link having a first end rotatably connected to the installation plane and an opposite second end;

a second link having a first end rotatably connected to the display main body and a second end rotatably connected to the second end of the first link; and an elastic tilting adjuster provided between the first link and the second link to frictionally adjust the tilt of the display main body against the installation plane.

30. The display apparatus according to claim 29, wherein the tilting adjuster comprises at least one of a spring and a washer.

31. A display apparatus including a display main body formed with a display part, the display apparatus comprising:
- a lower hinge part provided in a rear lower part of the display main body to tilt the display main body against an installation plane; and
- a link assembly provided in a rear upper part of the display main body, and connecting the display main body to the installation plane, the link assembly including:
- a first link having a first end rotatably connected to the installation plan and an opposite second end;
- a second link having a first end rotatably connected to the display main body and a second end rotatably connected to the second end of the first link;
- a friction part provided between the first and second links and producing a rotation friction therebetween;
- a base bracket mounted onto the installation plane and supporting the display main body and the link assembly, the base bracket including a first link bracket rotatably connected to the first end of the first link, and a second link bracket rotatably connected to the rear lower part of the display main body; and
- a main body bracket detachably connected to the rear of the display main body, the main body bracket including an upper part rotatably connected to the first end of the second link, and a lower part rotatably connected to the second link bracket of the base bracket.

* * * * *